(12) United States Patent
Gastrich

(10) Patent No.: US 10,933,791 B2
(45) Date of Patent: Mar. 2, 2021

(54) COLLAPSIBLE TRAILER FOR TRANSPORTING A MOTORCYCLE OR OTHER CARGO

(71) Applicant: Justin Gastrich, Alameda, CA (US)

(72) Inventor: Justin Gastrich, Alameda, CA (US)

(73) Assignee: Justin Gastrich, Alameda, CA (US)

( * ) Notice: Subject to any disclaimer, the term of this patent is extended or adjusted under 35 U.S.C. 154(b) by 0 days.

(21) Appl. No.: 16/405,954

(22) Filed: May 7, 2019

(65) Prior Publication Data

US 2020/0353855 A1    Nov. 12, 2020

(51) Int. Cl.
| | |
|---|---|
| *B60P 1/00* | (2006.01) |
| *B60P 1/43* | (2006.01) |
| *B60P 3/077* | (2006.01) |
| *B60D 1/14* | (2006.01) |
| *B60D 1/62* | (2006.01) |
| *B60P 3/079* | (2006.01) |

(52) U.S. Cl.
CPC ............... *B60P 1/435* (2013.01); *B60D 1/14* (2013.01); *B60D 1/62* (2013.01); *B60P 3/077* (2013.01); *B60P 3/079* (2013.01)

(58) Field of Classification Search
CPC .... B60D 1/14; B60D 1/06; B60D 1/62; B60P 3/07; B60P 3/122; B60P 1/16
See application file for complete search history.

(56) References Cited

U.S. PATENT DOCUMENTS

| | | | | |
|---|---|---|---|---|
| 4,732,914 A | * | 3/1988 | Morton, Jr. ........... | C07C 29/095 514/530 |
| 4,786,073 A | * | 11/1988 | Harper ................. | B62D 63/061 280/491.1 |
| 5,228,712 A | * | 7/1993 | Speier ..................... | B60D 1/06 280/401 |
| 5,570,898 A | * | 11/1996 | Albert ...................... | B60P 3/07 280/639 |
| 6,428,035 B1 | * | 8/2002 | Maxwell ................. | B60P 3/122 280/656 |
| 7,258,362 B2 | * | 8/2007 | Thurm ..................... | B60P 3/07 280/491.1 |
| 8,157,288 B2 | * | 4/2012 | Kapels ..................... | B60D 1/06 280/416.1 |
| 8,235,412 B2 | * | 8/2012 | Norton ................. | B62D 63/062 280/639 |
| 8,246,068 B2 | * | 8/2012 | MacDougall ............. | G09F 7/20 280/491.1 |
| 9,725,024 B1 | * | 8/2017 | Davis ...................... | B60P 1/16 |

(Continued)

*Primary Examiner* — Hau V Phan

(57) ABSTRACT

A trailer apparatus has a hitch bar, a first frame member coupled to the hitch bar by a compound pivot, and to a second frame member, allowing the second frame member to rotate vertically about the first frame member, a wheel mounted on a horizontal axis to one side of the first frame member, an elongated connecting link member coupled to the first frame member at a and to the second frame member at a position along the length of the second frame member, a first cargo-supporting element mounted to the same side of the first frame member as the wheel is mounted and a second cargo-supporting element mounted to the second frame member on the same side as the wheel is mounted, wherein the trailer may be configured into three positions, one for loading, one for hauling, and a third with the apparatus stowed for transport.

8 Claims, 8 Drawing Sheets

(56) References Cited

U.S. PATENT DOCUMENTS

2003/0102655 A1* 6/2003 Thompson ........... B62D 63/061
 280/656
2008/0157493 A1* 7/2008 McConkey .......... B62D 63/061
 280/40

* cited by examiner

COLLAPSIBLE TRAILER FOR TRANSPORTING A MOTORCYCLE OR OTHER CARGO

BACKGROUND OF THE INVENTION

1. Field of the Invention

The present invention is in the field of towing and hauling; in particular, trailers.

2. Description of Related Art

In the field of towing or hauling, more particularly those methods and devices used for a motorcycle, many different types of vehicles, trailers and carriers have been developed. These devices fall generally into three categories: cargo vehicles, carriers and trailers. Cargo vehicles include pickup trucks and commercial vans. Carriers attach rigidly to the tow vehicle and the entire payload is supported by the vehicle. Trailers typically attach to the tow vehicle by means of a conventional ball hitch, and both the trailer axle and the vehicle share the payload.

One of the most common methods for transporting a motorcycle is in the bed of a pickup or cargo area of a van. These vehicles often have payload capacities far in excess of those required to haul a single motorcycle. These vehicles have several downsides when compared to cars and SUVs: 1) they often have significantly inferior fuel mileage 2) they are often larger in size, requiring more parking space 3) they are often more expensive 4) they are more specialized in their use, suffer from limited seating, and therein can be less functional as a family-vehicle. The cargo areas of all these vehicles are the most elevated of the three methods for transporting a motorcycle, and they require the use of a ramp for loading. Some safety concerns may accompany the use of ramps elevated to this level for loading.

Though one of the most compact and low-cost options for hauling a motorcycle, a major limitation presented by carriers is that they are restricted for use only with vehicles that have relatively large payload capacities. These vehicles are generally either trucks, commercial vans, or large SUVs. Except for the SUVs respect to seating ability, all these vehicles suffer from the disadvantages listed above when compared to smaller vehicles. The carrier height when mounted on these vehicles is relatively high, and the carrier requires the use of a ramp for loading. Some safety concerns may accompany the use of ramps elevated to this level for loading. In addition, the handling characteristics of the vehicle can be negatively impacted due to the heavy cantilevered load. Another limitation of carriers is the loss of access to the vehicle's tailgate or hatch. Finally, since carries do not have a wheel, they require the operator to fully lift and carry the unit when it's not attached to the tow vehicle.

Trailers allow for the widest variety of tow vehicles to be used, but the trailers themselves can often suffer from the following disadvantages: 1) space-consuming to store 2) excessively heavy and non-streamlined construction for a payload as light as a motorcycle, thereby negatively impacting the tow vehicle's fuel mileage 3) require additional driver skill due to the wider track of the trailer's path when turning 4) high load height that requires the use of a separate ramp 5) weight and handling challenges for an operator attempting to maneuver the trailer when not attached to the tow vehicle.

Therefore, what is clearly needed is a trailer that solves the problems mentioned above.

BRIEF SUMMARY OF THE INVENTION

In one embodiment of the invention a trailer system is provided comprising a hitch bar having a first end adapted for inserting into a trailer hitch receiver mounted on a tow vehicle, and an elongated first frame member having a length and long axis, coupled at a first end to a second end of the hitch bar by a compound pivot providing vertical and horizontal rotation between the hitch bar and the first frame member, but not rotation of the first frame member about the long axis, and an elongated second frame member coupled at a first end to a second end of the first frame member by a horizontal pivot axis, allowing the second frame member to rotate vertically about the first frame member, and a wheel mounted on a horizontal axis at or near the second end of the first frame member, to a first side of the first and second frame members, and an elongated connecting link member coupled by a first horizontal pin to the first frame member at a position along the length of the first frame member, and by a second horizontal pin to the second frame member at a position along the length of the second frame member, such that, with the hitch bar in a trailer hitch receiver on the tow vehicle, and the wheel on ground surface, the end of the second frame member opposite the one end coupled to the first frame member is elevated above ground level, and a first cargo-supporting element mounted to the same side of the first frame member as the wheel is mounted, and a second cargo-supporting element mounted to the second frame member on the same side as the wheel is mounted, wherein releasing the connecting link member on the end coupled to the second frame member enables lowering a second end of the second frame member to ground, facilitating loading a cargo onto the cargo-supporting elements, raising and reconnecting the second frame member results in supporting the frame members with cargo loaded on the wheel, such that the trailer apparatus may be towed on the one wheel with the cargo loaded, and wherein, with no cargo loaded, releasing the connecting link member on the end coupled to the second frame member enables the second frame member to be folded over the first frame member, and the two frame members to be rotated vertically around the compound pivot to place the apparatus in a vertical position supported by the hitch bar, and coupling the connecting link to a pin in the hitch bar secures the apparatus in the vertical position to be carried by the tow vehicle.

Also in one embodiment an L-shaped channel implemented in the end of the connecting link coupling to the second frame member, wherein a horizontal portion of the channel enables lowering the second end of the second frame member to ground without removing the second horizontal pin, and wherein the vertical portion of the L-shaped channel provides a locking mechanism with the second frame member elevated. Also in one embodiment an additional pin securing the connecting link to the second frame member when the second frame member is elevated. Also in one embodiment the first and second cargo-supporting elements are tire wells adapted to receive tires of a motorcycle, with the tire wells in line with the wheel of the trailer apparatus, such that the weight of the motorcycle is balanced over the wheel. Also in one embodiment the horizontal axis of the wheel is also the horizontal pivot axis between the first and the second frame members. Also in one embodiment stop and turn-signal lights mounted to the second end of the second frame member, having electrical conductors implemented along the frame members with an electrical connector at or near the hitch bar enabling connecting to conductors of the tow vehicle. Also in one embodiment the tire wells are adjustable to accommodate differing wheel bases and wheel diameters for different motorcycles. Also in one embodiment the elements for securing the motorcycle to the trailer apparats in transit.

DETAILED DESCRIPTION OF THE INVENTION

The inventor provides a unique, collapsible and adaptable trailer held upright by the tow vehicle for purposes of transporting two-wheeled vehicles and/or other cargo. The trailer folds onto itself in such a manner it may be stowed and fully supported by on the vehicle when empty. Also, in this compact stowage configuration the wheel is positioned to support the trailer for manual maneuvering when not attached to the tow vehicle without the need to lift and carry the trailer. The present invention is described in enabling detail in the following examples, which may represent more than one embodiment of the present invention.

Figure 1:
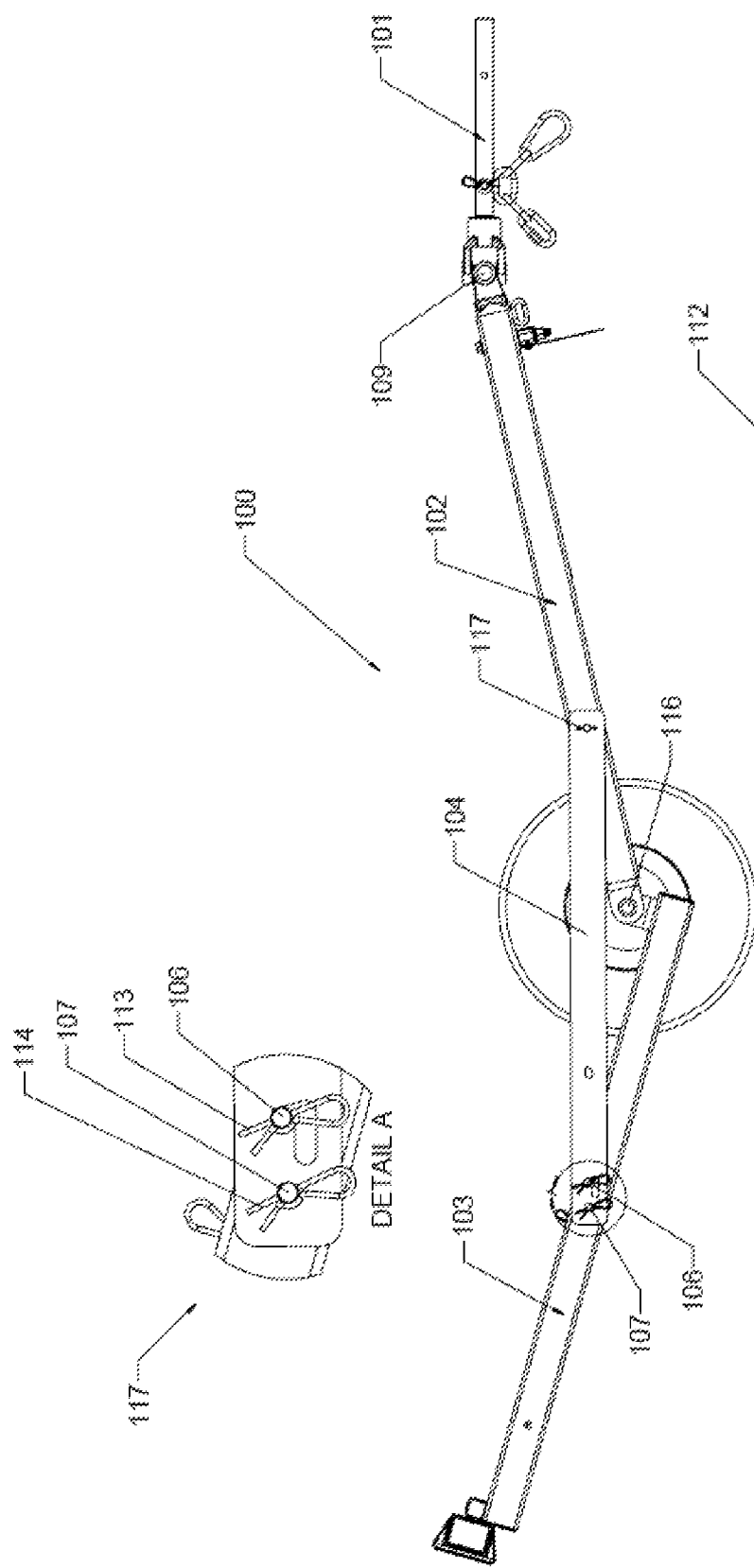
FIG. 1 is the right-side view of an embodiment of the trailer in the Hauling Position.

FIG. 1 is a right-side view of a trailer 100 in the Hauling Position according to an embodiment of the present invention. Three major sections make up this embodiment of trailer 100: the hitch bar 101, the main tube 102 and the tail section 103. Hitch bar 101 is connected to main tube 102 via a joint 109 that allows for pivoting in the horizontal and vertical axes, but locks twisting along the longitudinal axis. Joint 109 is more commonly known as a "universal joint". In this example, main tube 102 is connected, non-rigidly, to tail section 103 by a single horizontal pin 116. In this embodiment of trailer 100, pin 116 is also the wheel axle. In this configuration of trailer 100, the tie-plate 104 is used to retain tail section 103 in the elevated Hauling Position. As shown in "Detail A", tie-plate 104 has a gravity-locking mechanism 117 that latches into place against the clevis pin 106 when tail section 103 is lifted to the appropriate height. In this example, another clevis pin 107 is then inserted through a hole in tail section 103 and tie-plate 104 to ensure against the unintended release of the gravity-locking mechanism 117 when the system is in use. The hairpin 113 and the hairpin 114 both allow for quick removal of, and the secure retention of, clevis pin 106 and clevis pin 107, respectively.

Figure 2:
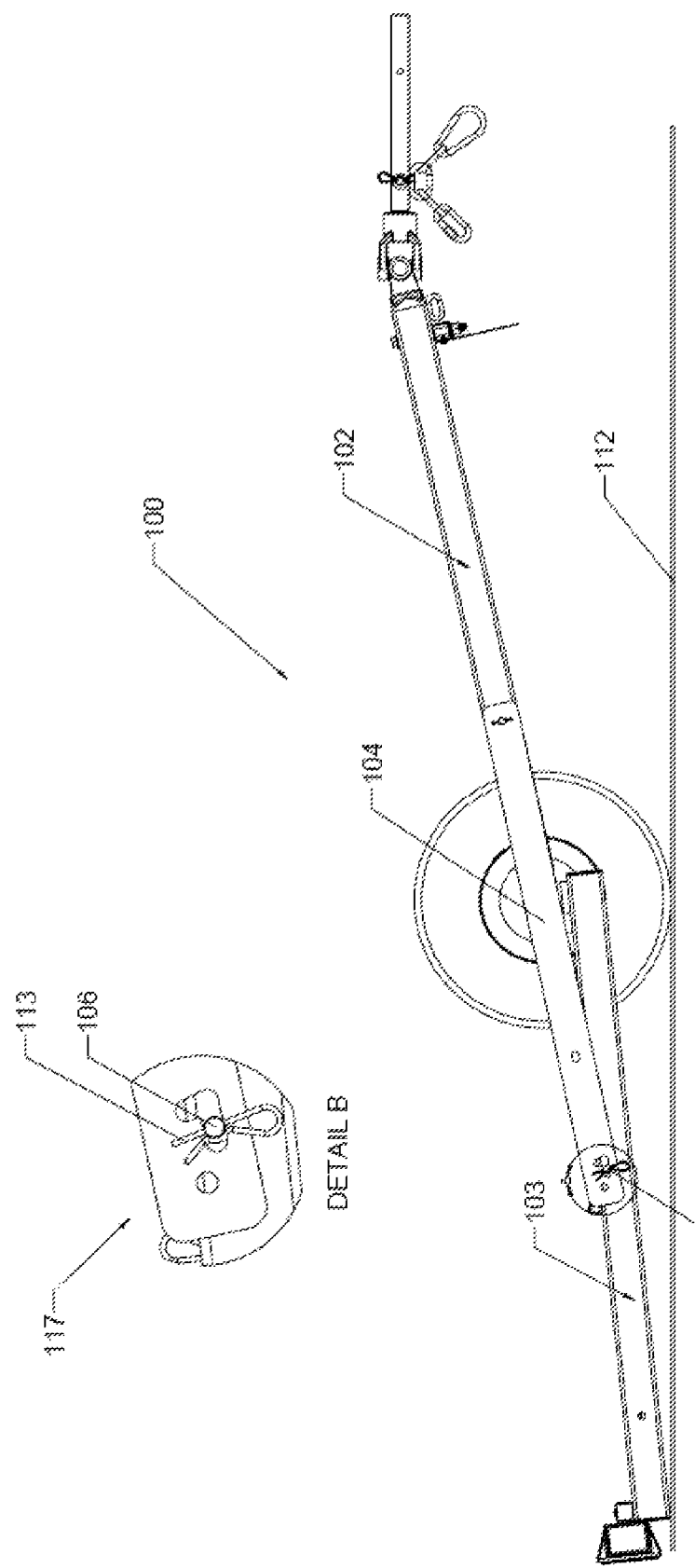
FIG. 2 is the right-side view of an embodiment of the trailer in the Loading Position.

FIG. 2 is the right-side view of an embodiment of trailer 100 in the Loading Position. Shown here tail section 103 rest on ground 112 to allow for roll-on loading of motorcycle 501. In the Loading Position, gravity-locking mechanism 117, as shown in "Detail B", is in the unlatched state. Clevis pin 107 has been removed to allow for gravity-locking mechanism 117 to move to this floating position.

Figure 3:
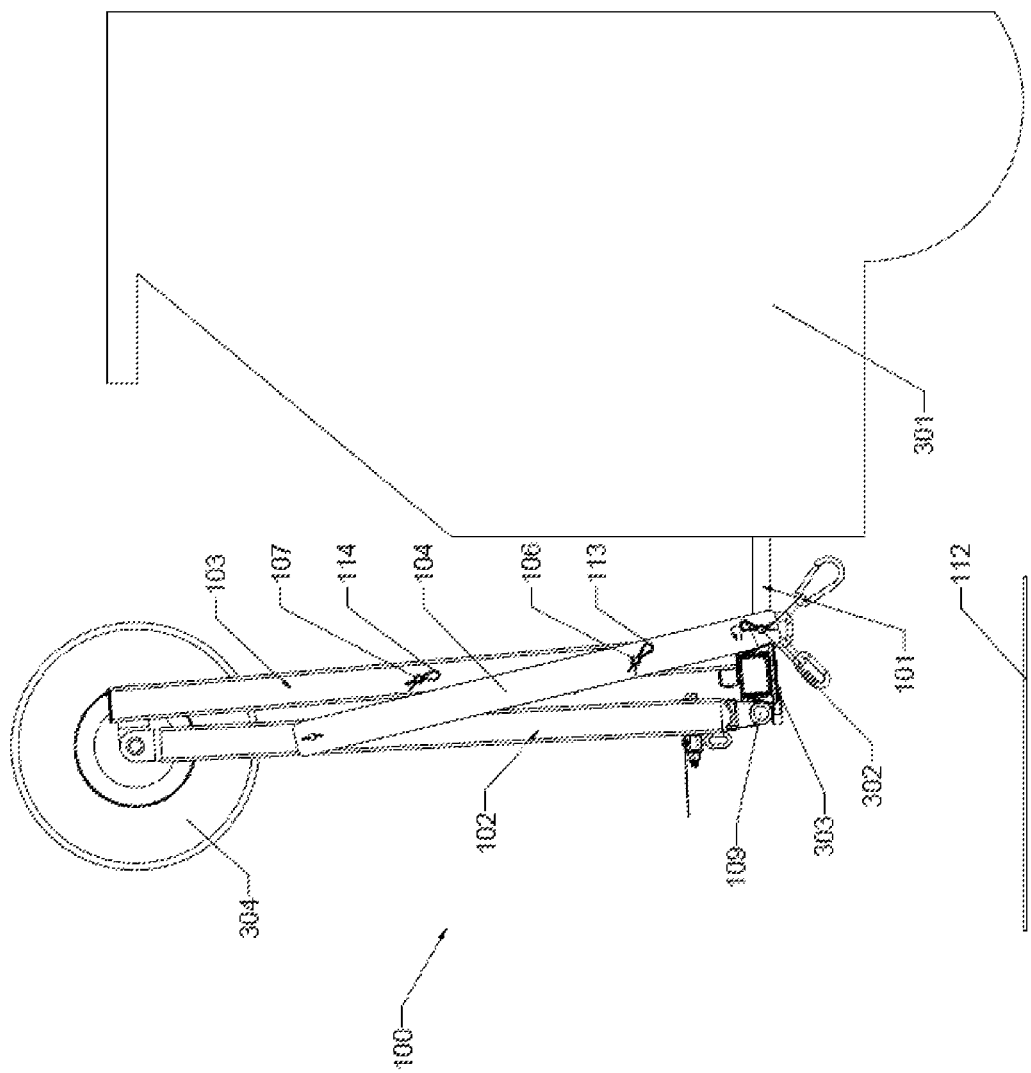
FIG. 3 is the right-side view of an embodiment of the trailer in the Stowed Position.

FIG. 3 is the right-side view of an embodiment of trailer 100 in the Stowed Position. In this position the tow vehicle 301 completely supports trailer 100 with the wheel 304 elevated off ground 112. This configuration of trailer 100 is maintained by attaching tie-plate 104 to the stow pin 302 on hitch bar 101 and retaining it with the hairpin 303. Clevis pin 106 and hairpin 113, previously used to backup-lock gravity-locking mechanism 117, are repurposed to hold in place tail section 103 relative to tie-plate 104. In the Stowed Position tow vehicle 301 may haul trailer 100, as shown in this embodiment of the invention. Trailer 100 does not require being attached to tow vehicle 301 to be in the Stowed Position. Therefore, when inverted or held parallel to ground 112, so wheel 304 is in contact with ground 112, this is an ideal configuration for manual maneuvering of trailer 100 without the need to lift or carry it.

Figure 4:
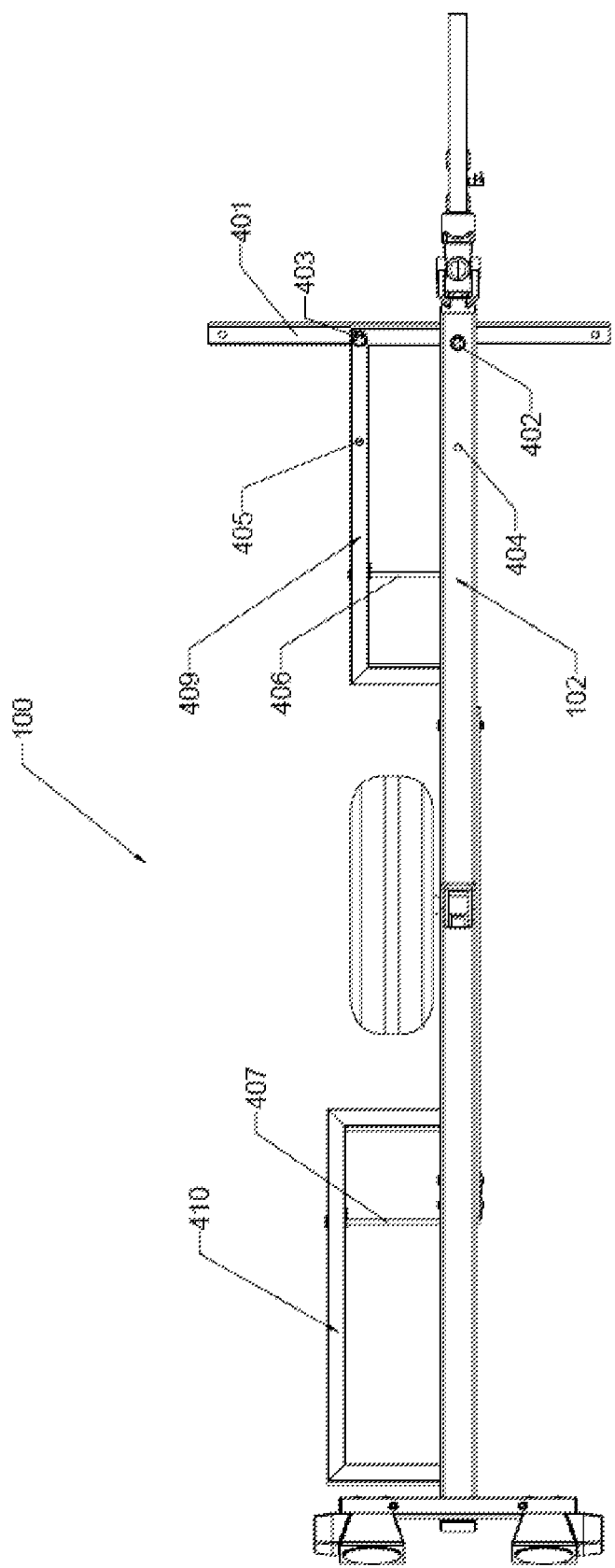
FIG. 4 is the top-side view of an embodiment of the trailer in the Hauling Position.

FIG. 4 is the top-side view of an embodiment of trailer 100 in the Hauling Position. Shown here are the front tire well 409, the rear tire well 410 and the tire well pins 406 and 407. Tire well pins 406 and 407 are retained by the hairpins 504 and 510. Tire well pins 406 and 407 may be repositioned into other holes (the hole 509 as an example) depending on the wheelbase and wheel diameters of the motorcycle 501. In addition, tire well pin 407 and an appropriately-located hole (hole 509 as an example) may be used to retain the spoked motorcycle wheel 506 to trailer 100 by threading tire well pin 407 between the spokes and over the rim of the motorcycle wheel 506 after settling wheel 506 into tire well 410. In order to adjust this embodiment of trailer 100 for a motorcycle with a different wheelbase, the strap crossbar 401 can be repositioned with the bolts 402 and 403 to another set of holes 404 and 405 on main tube 102 and tire well 409.

Figure 5:
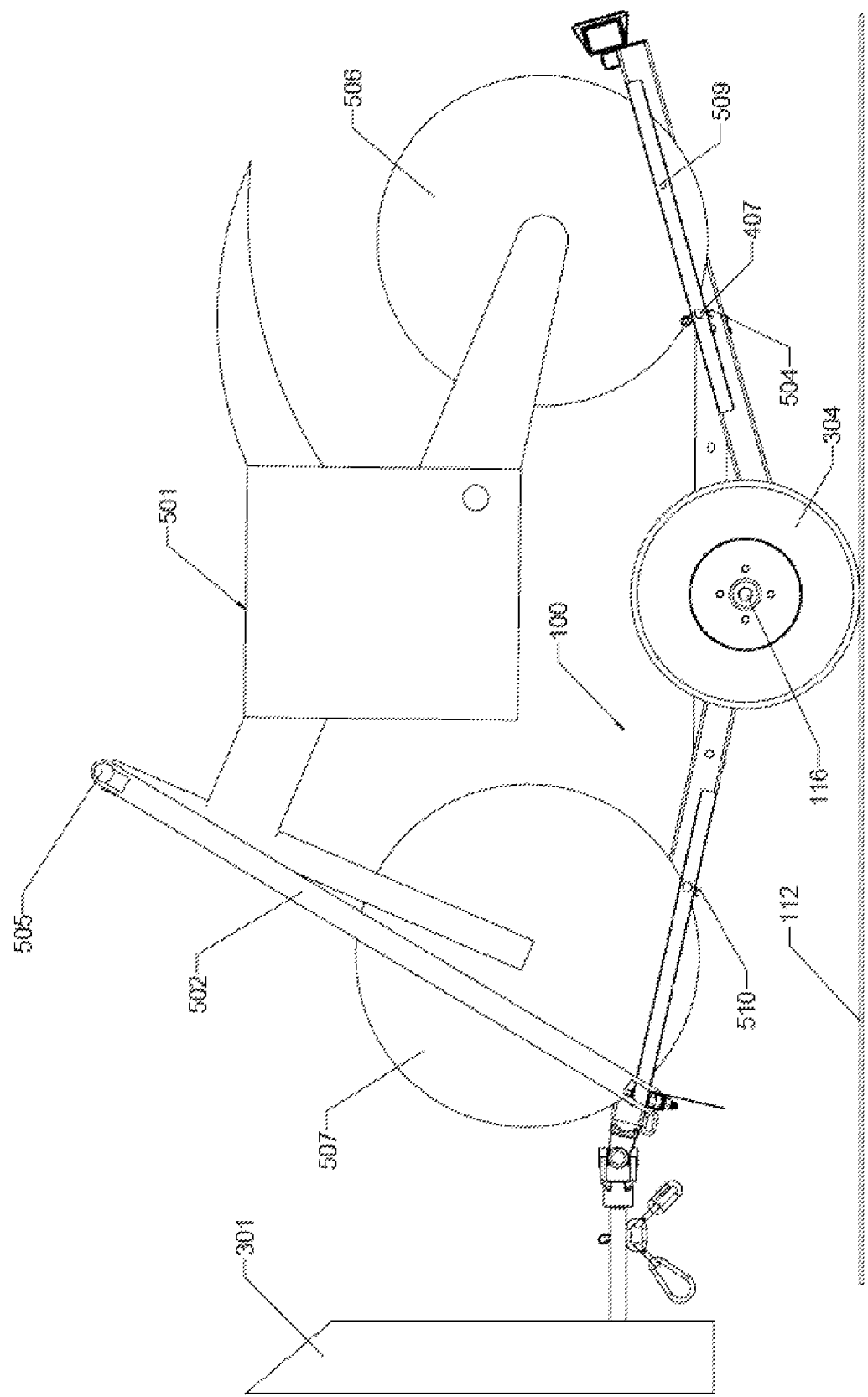
FIG. 5 is the left-side view of an embodiment of the trailer in the Hauling Position, carrying a motorcycle.

FIG. 5 is the left-side view of an embodiment of trailer 100 in the Hauling Position, carrying motorcycle 501. According to this embodiment of trailer 100, wheel 304 is centrally located to minimize tongue weight on tow vehicle 301. Motorcycle 501 is secured to trailer 100 via a pair of straps 502 that run between the handlebars 505 and ends of strap crossbar 401.

Figure 6:
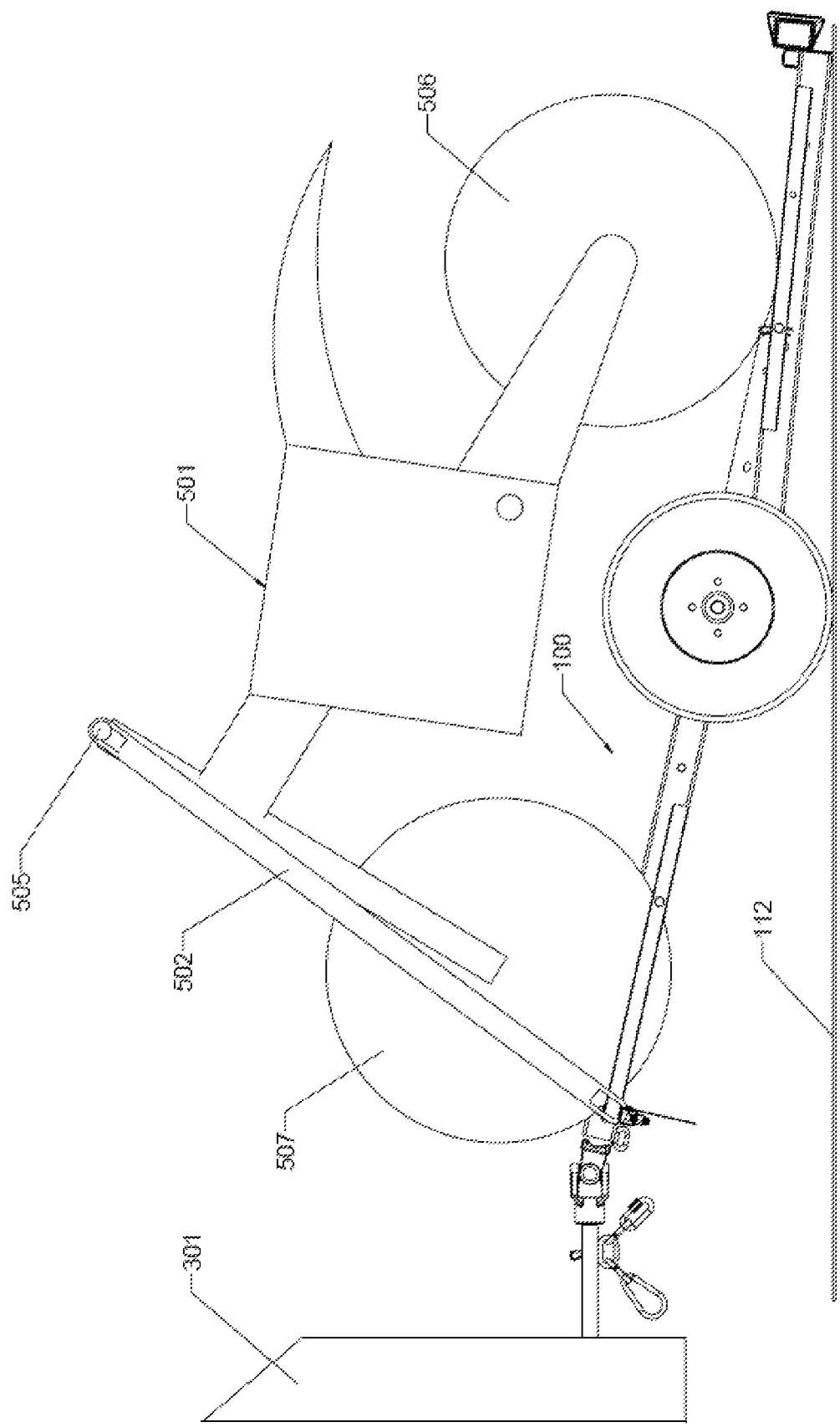
FIG. 6 is the left-side view of an embodiment of the trailer in the Loading Position, loading a motorcycle.

FIG. 6 is the left-side view of an embodiment of trailer 100 in the Loading Position, loading motorcycle 501. While aligning both tires of motorcycle 501 with the top surface of tail section 103 and main tube 102, motorcycle 501 can be manually pushed up the gentle slope main tube 102 and tail section 103 make with ground 112 until the front wheel 507 drops into front tire well 409. The operator can then install and cinch straps 502 before lifting tail section 103 until gravity-locking mechanism 117 activates, holding tail section 103 of the trailer 100 in this example in the elevated Hauling Position. Clevis pin 107 and hairpin 114 are then inserted, securing tie-plate 104 into position for hauling.

Figure 7:
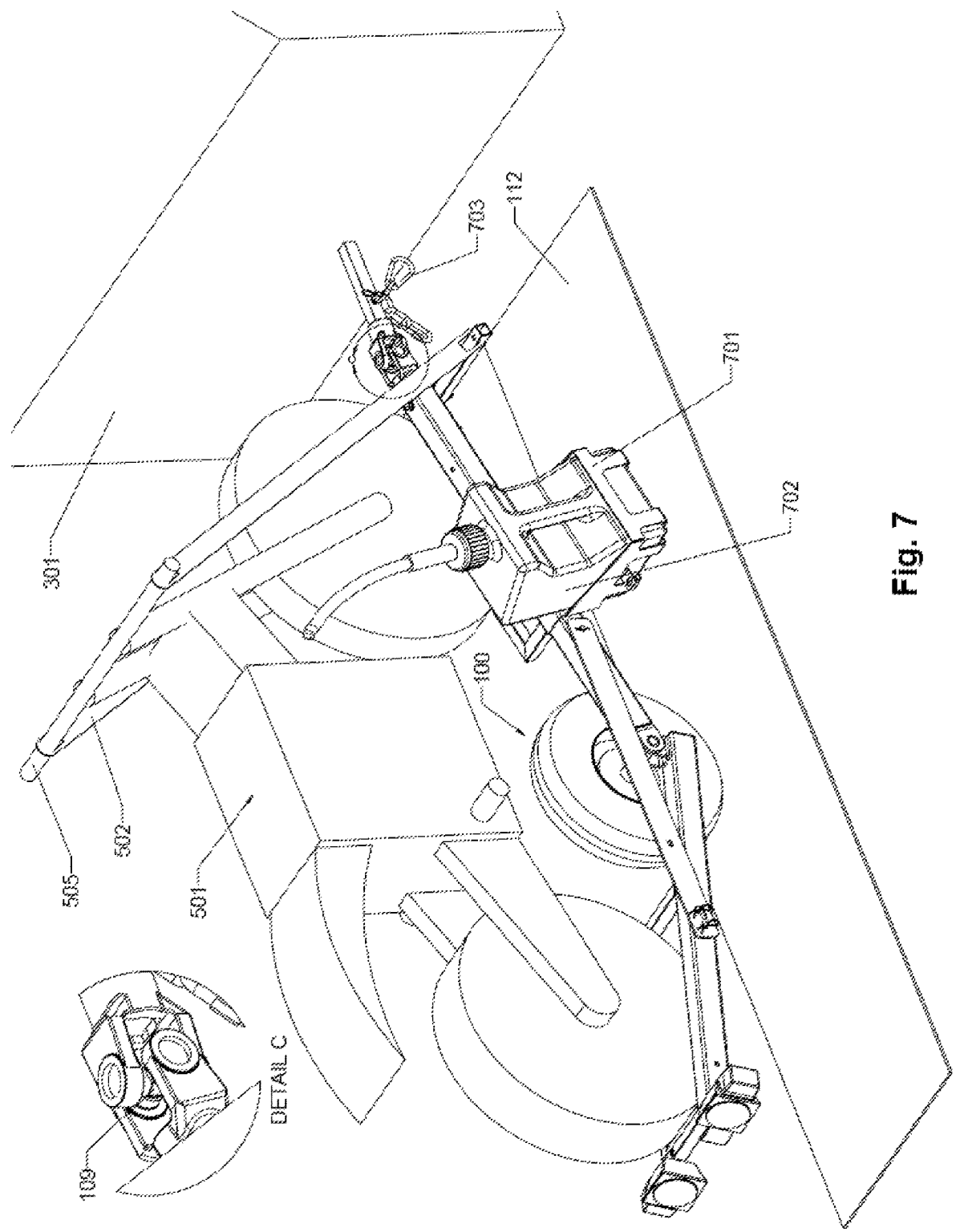
FIG. 7 is a view of an embodiment of the trailer in the Hauling Position, carrying a motorcycle and fuel jug.

FIG. 7 is a view of an embodiment of trailer 100 in the Hauling Position, carrying motorcycle 501 and fuel jug 702. Fuel jug 702 is supported by a removable fuel jug bracket 701. Joint 109 is shown in "Detail C". A safety chain 703 connects main tube 102 to both hitch bar 101 and to tow vehicle 301.

Figure 8:
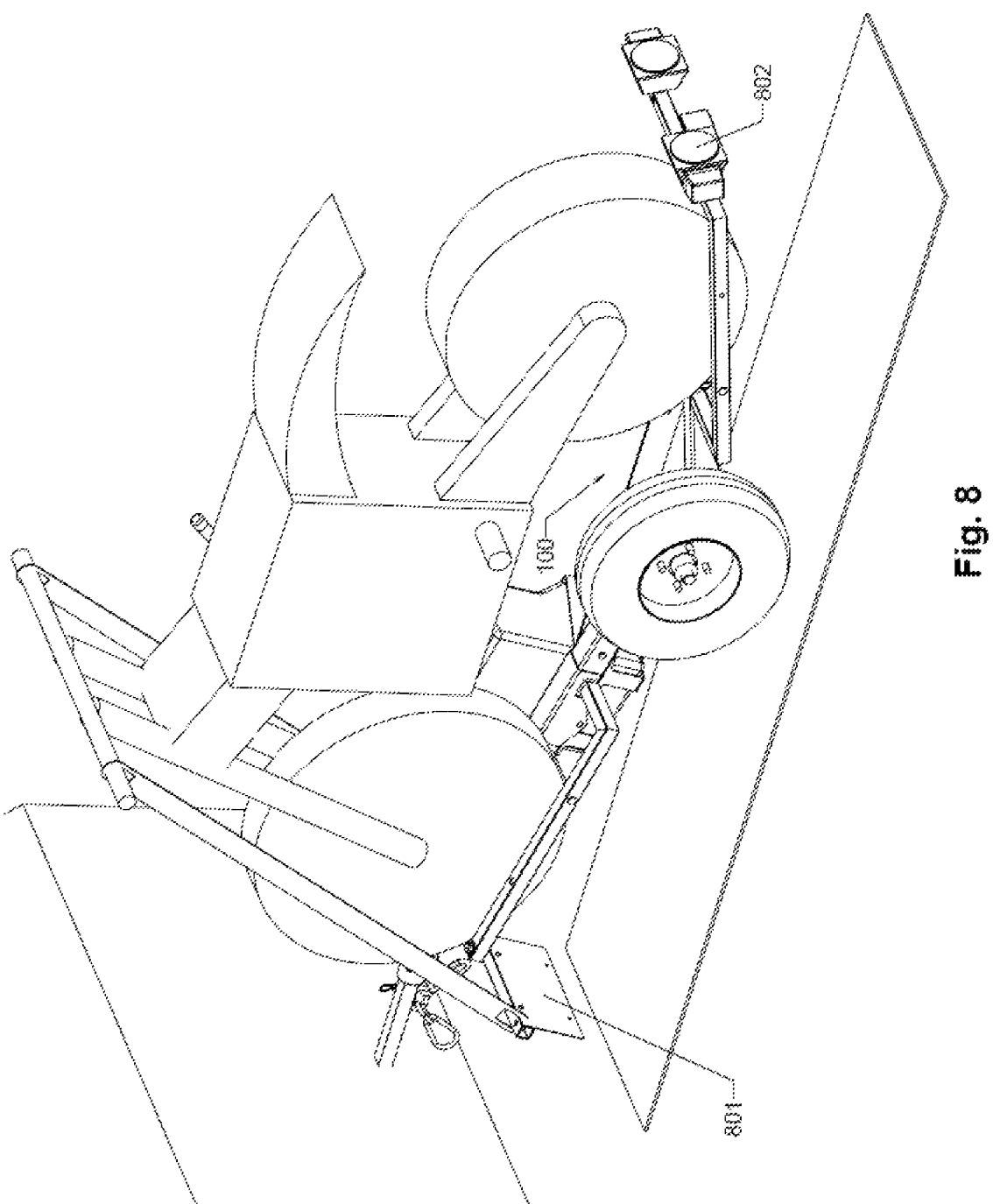
FIG. 8 is another view of an embodiment of the trailer in the Hauling Position, carrying a motorcycle and fuel jug.

FIG. 8 is another view of an embodiment of trailer 100 in the Hauling Position, carrying motorcycle 501 and fuel jug 702. The taillights 802 are mounted on the end of tail section 103. A license plate 801 is mounted on strap crossbar 605 in this embodiment, and may also be mount behind one of taillights 802 in another embodiment.

It will be apparent to one with skill in the art that the trailer invention may be provided using some of or all of the mentioned features and components without departing from the sport and scope of the present invention. It will also be apparent to the skilled artisan that the embodiments described above are specific examples of the single broader invention which may have great scope than any of the singular descriptions taught. There may be many alterations made in the descriptions without departing form the spirit and scope of the present invention.

The invention claimed is:

1. A trailer apparatus, comprising:
a hitch bar having a first end adapted for inserting into a trailer hitch receiver mounted on a tow vehicle;
an elongated first frame member having a length and long axis, coupled at a first end to a second end of the hitch bar by a compound pivot allowing vertical and horizontal rotation between the hitch bar and the first frame member, but due to the arrangement of the axes of the said compounding pivot not allowing rotation between the hitch bar and the long axis of the first frame member;
an elongated second frame member coupled at a first end to a second end of the first frame member by a horizontal pivot axis, allowing the second frame member to rotate vertically about the first frame member;
a wheel mounted on a horizontal axis at or near the second end of the first frame member, to a first side of the first and second frame members;
an elongated connecting link member coupled by a first horizontal pin to the first frame member at a position along the length of the first frame member, and by a second horizontal pin to the second frame member at a position along the length of the second frame member, such that, with the hitch bar in said trailer hitch receiver on the tow vehicle, and the wheel on ground surface, the end of the second frame member opposite the one end coupled to the first frame member is elevated above ground level;
a first cargo-supporting element mounted to the same side of the first frame member as the wheel is mounted; and
a second cargo-supporting element mounted to the second frame member on the same side as the wheel is mounted;
wherein releasing the connecting link member on the end coupled to the second frame member enables lowering a second end of the second frame member to ground, facilitating loading a cargo onto the cargo-supporting elements, raising and reconnecting the second frame member results in supporting the frame members with cargo loaded on the wheel, such that the trailer apparatus towed on the one wheel with the cargo loaded, and wherein, with no cargo loaded, releasing the connecting link member on the end coupled to the second frame member enables the second frame member to be folded over the first frame member, and the two frame members to be rotated vertically around the compound pivot to place the apparatus in a vertical position supported by the hitch bar, and coupling the connecting link to a pin in the hitch bar secures the apparatus in the vertical position to be carried by the tow vehicle.

2. The trailer apparatus of claim 1 further comprising an L-shaped channel implemented in the end of the connecting link coupling to the second frame member, wherein a horizontal portion of the channel enables lowering the second end of the second frame member to ground without removing the second horizontal pin, and wherein the vertical portion of the L-shaped channel provides a locking mechanism with the second frame member elevated.

3. The trailer apparatus of claim 2 further comprising an additional pin securing the connecting link to the second frame member when the second frame member is elevated.

4. The trailer apparatus of claim 1 wherein the first and second cargo-supporting elements are tire wells adapted to receive tires of a motorcycle, with the tire wells in line with the wheel of the trailer apparatus, such that the weight of the motorcycle is balanced over the wheel.

5. The trailer apparatus of claim 4 wherein the tire wells are adjustable to accommodate differing wheel bases and wheel diameters for different motorcycles.

6. The trailer apparatus of claim 4 further comprising elements for securing the motorcycle to the trailer apparats in transit.

7. The trailer apparatus of claim 1 wherein the horizontal axis of the wheel is also the horizontal pivot axis between the first and the second frame members.

8. The trailer apparatus of claim 1 further comprising stop and turn-signal lights mounted to the second end of the second frame member, having electrical conductors implemented along the frame members with an electrical connector at or near the hitch bar enabling connecting to conductors of the tow vehicle.

* * * * *